(No Model.)
L. BRANDEIS.
TRAP.
No. 246,453. Patented Aug. 30, 1881.
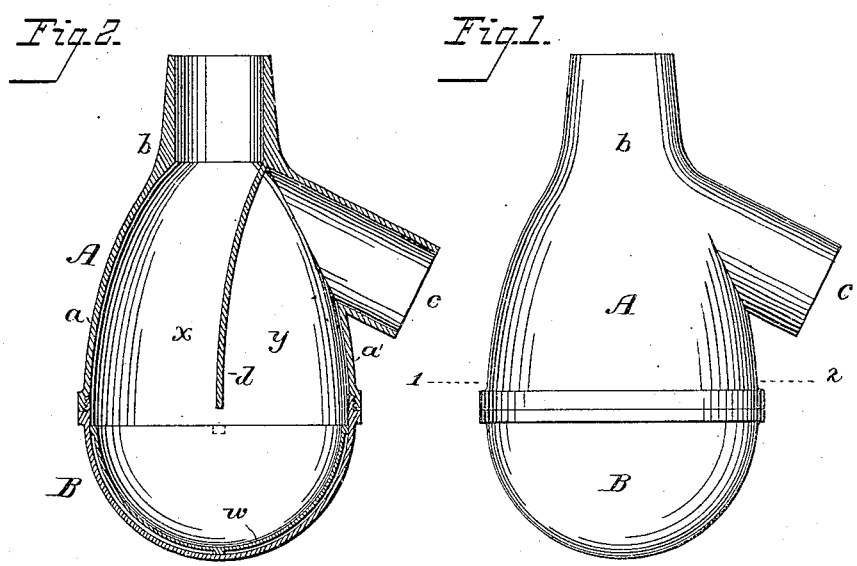
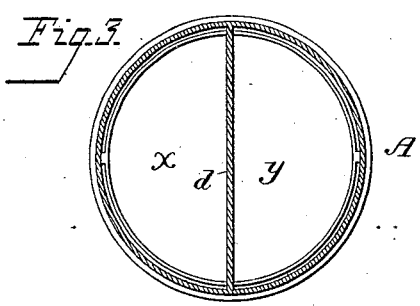

UNITED STATES PATENT OFFICE.

LUDWIG BRANDEIS, OF BROOKLYN, NEW YORK, ASSIGNOR TO LEOPOLD BRANDEIS, OF SAME PLACE.

TRAP.

SPECIFICATION forming part of Letters Patent No. 246,453, dated August 30, 1881.

Application filed May 31, 1881. (No model.)

*To all whom it may concern:*

Be it known that I, LUDWIG BRANDEIS, of Brooklyn, Kings county, New York, have invented certain Improvements in Traps, of which the following is the specification.

My invention is a trap of the peculiar construction hereinafter fully set forth, whereby the manufacture is facilitated and cheapened, an effectual water-seal secured, and the clogging up of the trap from adhering deposits prevented.

In the drawings, Figure 1 is a side elevation of the improved trap. Fig. 2 is a sectional elevation. Fig. 3 is a sectional plan on the line 1 2, Fig. 1.

The trap is of the class known as "bottle-traps," having a flask-like body, a neck tapering to the end, and a branch of uniform diameter or enlarging toward the end.

Heretofore the construction of such traps has been such as to require so great an amount of hand-work in the manufacture that the expense of making them was a serious objection to their use, while, owing to the limited dimensions of the water seal, the desired security against siphoning was not afforded.

I overcome these objections by constructing the trap in two parts, the body A, neck $b$, branch $c$, and a partition, $d$, (forming with the body the inlet-tube,) being cast in one piece, and the bottom B being cast in another, the two parts being secured by a bushing or in any other suitable manner, so that the lower part may be unscrewed or detached from the upper to examine or clean the trap.

The neck $b$ may taper and the sides $a$ $a'$ diverge from the partition $d$, so that the spaces $x y$ on opposite sides of the partition gradually contract toward the top, permitting the use of cores which can be readily withdrawn in casting, facilitating and cheapening the manufacture. A draw-core can also be used in casting the branch $c$, but none is required for the bottom section.

In this trap I secured a most effectual water seal by gradually widening and then contracting the passage, as in the trap patented to me February 1, 1876, No. 172,865. Thus the mouth of the neck $b$ may be one and a half inch in diameter, as is the branch $c$, while the body widens so that the passage on opposite sides of the partition $d$, at the lower end thereof, is two inches in diameter, securing a water seal at the widest portion of four inches in diameter, contracting gradually toward the inlet and outlet to one and a half inch. These proportions and dimensions may be varied, however, without affecting the general result.

By this construction I maintain a body of water in the trap so much greater than can be discharged by one impulse through the contracted openings that siphoning is prevented, as in the trap patented to me as aforesaid.

To prevent the adhesion of grease and other matter to the bottom of the trap, I place therein a nicely-fitting detachable cup, $w$, which, when the parts of the trap are separated, may be cleansed and replaced. The said cup further serves as a receptacle for disinfecting material, which may be renewed from time to time. Such cup will preferably conform to the shape of the trap at the point where it is placed.

I claim—

1. A bottle-trap in two sections, the upper consisting of the body A, neck $b$, branch $c$, and partition $d$, forming, with the body, the gradually-contracting spaces $x y$ on opposite sides, substantially as set forth.

2. The combination, in a trap, of the bottom piece, B, and the body A, having a neck and branch, and partition $d$, the body at each side diverging from the partition forming spaces $x y$, each widest at the lower portion, substantially as set forth.

3. A trap composed of separable parts, the lowest provided with a removable cup, $w$, substantially as set forth.

In testimony whereof I have signed my name to this specification in the presence of two subscribing witnesses.

LUDWIG BRANDEIS.

Witnesses:
LEOPOLD BRANDEIS,
EDW. F. KEATING.